US011386271B2

(12) United States Patent
Liu et al.

(10) Patent No.: US 11,386,271 B2
(45) Date of Patent: Jul. 12, 2022

(54) MATHEMATICAL PROCESSING METHOD, APPARATUS AND DEVICE FOR TEXT PROBLEM, AND STORAGE MEDIUM

(71) Applicant: Tencent Technology (Shenzhen) Company Limited, Shenzhen (CN)

(72) Inventors: Xiaojiang Liu, Shenzhen (CN); Yan Wang, Shenzhen (CN); Shuming Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 439 days.

(21) Appl. No.: 16/548,635

(22) Filed: Aug. 22, 2019

(65) Prior Publication Data

US 2019/0377797 A1 Dec. 12, 2019

Related U.S. Application Data

(63) Continuation of application No. PCT/CN2018/100054, filed on Aug. 10, 2018.

(30) Foreign Application Priority Data

Aug. 11, 2017 (CN) .......................... 201710687829.7

(51) Int. Cl.
*G06F 16/332* (2019.01)
*G06F 40/30* (2020.01)
(Continued)

(52) U.S. Cl.
CPC .............. *G06F 40/30* (2020.01); *G06F 17/10* (2013.01); *G06F 16/3329* (2019.01); *G06F 16/90344* (2019.01)

(58) Field of Classification Search
CPC ....................... G06F 16/90344; G06F 16/3329
See application file for complete search history.

(56) References Cited

U.S. PATENT DOCUMENTS

| 6,233,580 B1 * | 5/2001 | Kaplan ............... G06F 16/9014 |
| 2015/0363390 A1 * | 12/2015 | Mungi .................. G06F 40/211 704/9 |
| 2016/0358094 A1 * | 12/2016 | Fan ......................... G06N 3/084 |

FOREIGN PATENT DOCUMENTS

| CN | 105893476 A | 8/2016 |
| CN | 107590192 A | 1/2018 |

OTHER PUBLICATIONS

Tencent Technology, ISRWO, PCT/CN2018/100054, Nov. 8, 2018, 7 pages.

(Continued)

*Primary Examiner* — Feng-Tzer Tzeng
(74) *Attorney, Agent, or Firm* — Morgan, Lewis & Bockius LLP

(57) ABSTRACT

Embodiments of the present application disclose a mathematical processing method for a textual question, an apparatus, a computer device, and a computer storage medium. A numeral in a question text sequence is mapped to an expression word, a question text sequence including the expression word is encoded into a semantic vector, an expression is generated by using the semantic vector including question information, and the expression word in the expression is replaced with the mapped numeral, so that the obtained mathematical expression, compared with a preset fixed expression template, is more accurate, is more likely to meet question-answering requirements, and can improve intelligent question-answering accuracy.

20 Claims, 9 Drawing Sheets

(51) Int. Cl.
*G06F 17/10* (2006.01)
*G06F 16/903* (2019.01)

(56) References Cited

OTHER PUBLICATIONS

Tencent Technology, IPRP, PCT/CN2018/100054, dated Feb. 11, 2020, 6 pages.

* cited by examiner

US 11,386,271 B2

MATHEMATICAL PROCESSING METHOD, APPARATUS AND DEVICE FOR TEXT PROBLEM, AND STORAGE MEDIUM

CROSS-REFERENCE TO RELATED APPLICATIONS

This application is a continuation application of PCT/CN2018/100054, entitled "MATHEMATICAL PROCESSING METHOD FOR TEXTUAL QUESTION, APPARATUS, DEVICE, AND STORAGE MEDIUM" filed on Aug. 10, 2018, which claims priority to Chinese Patent Application No. 201710687829.7, entitled "MATHEMATICAL PROCESSING METHOD FOR TEXTUAL QUESTION, APPARATUS, DEVICE, AND STORAGE MEDIUM" filed with the National Intellectual Property Administration, PRC on Aug. 11, 2017, all of which are incorporated by reference in its their entirety.

FIELD OF THE TECHNOLOGY

The present disclosure relates to the field of computer technologies, and in particular, to a mathematical processing method for a textual question, an apparatus, a computer device, and a storage medium.

BACKGROUND OF THE DISCLOSURE

With development of science and technologies, artificial intelligence is applied increasingly widely, and researches on using artificial intelligence to answer questions also gradually draw much attention.

When artificial intelligence is applied to answering a question, an expression for answering the question needs to be determined. A current processing method is presetting expression templates, and answering questions by using the preset expression templates.

However, in the current method, only specific fixed expression templates can be used to answer questions, but questions are diverse, and preset expression templates often have limitations and cannot be applicable to all questions. Consequently, expressions used to answer questions are not accurate enough, leading to relatively low accuracy of intelligent question-answering.

SUMMARY

Based on this, a mathematical processing method for a textual question, an apparatus, a computer device, and a storage medium are provided, so that a problem that current expressions used for answering questions have low accuracy can be resolved specifically.

According to a first aspect, a mathematical processing method for a textual question is performed at a computing device having one or more processors and memory storing programs to be executed by the one or more processors, the method comprising:

obtaining a question text sequence;

mapping a numeral in the question text sequence to an expression word;

encoding the question text sequence including the expression word into a semantic vector;

decoding the semantic vector to generate a first expression, the first expression being an expression including the expression word; and replacing the expression word in the first expression with the mapped numeral, to obtain a second expression.

According to a second aspect, a computing device comprises one or more processors, memory coupled to the one or more processors and a plurality of programs stored in the memory that, when executed by the one or more processors, cause the computing device to perform the aforementioned mathematical processing method for a textual question.

According to a third aspect, a computer device is provided, including: a memory and a processor, the memory storing computer-readable instructions, and the computer-readable instructions, when executed by the processor, causing the processor to perform the aforementioned mathematical processing method for a textual question.

According to a fourth aspect, a non-transitory computer readable storage medium stores a plurality of machine readable instructions in connection with a first terminal having one or more processors. The plurality of machine readable instructions, when executed by the one or more processors, cause the first terminal to perform the aforementioned mathematical processing method for a textual question.

In the foregoing mathematical processing method for a textual question, apparatus, computer device, and storage medium, a numeral in a question text sequence is mapped to an expression word, a question text sequence including the expression word is encoded into a semantic vector, an expression is generated by using the semantic vector including question information, and the expression word in the expression is replaced with the mapped numeral, so that the obtained mathematical expression, compared with a preset fixed expression template, is more accurate, is more likely to meet question-answering requirements, and can improve intelligent question-answering accuracy.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
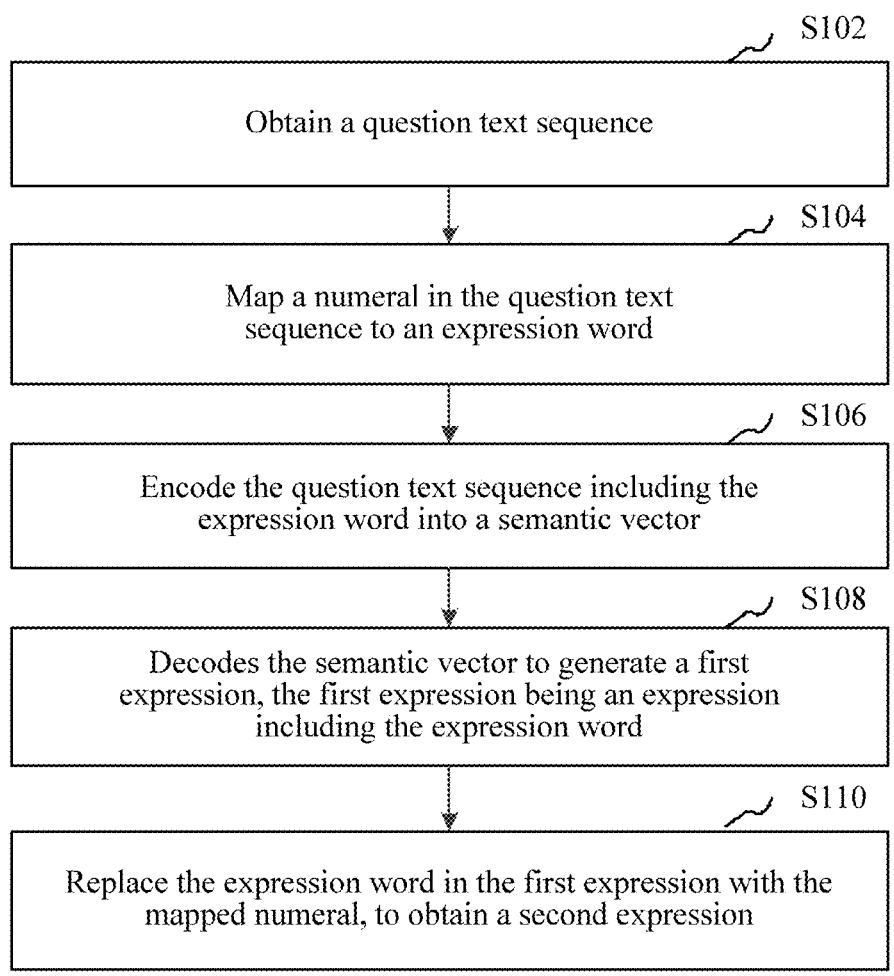
FIG. 1 is a schematic flowchart of a mathematical processing method for a textual question in an embodiment.

FIG. 1 is a schematic flowchart of a mathematical processing method for a textual question in an embodiment. In this embodiment, an example of applying the mathematical processing method for a textual question to a computer device is mainly used for description. The computer device may be a terminal or a server. Referring to FIG. 1, the method specifically includes the following steps.

S102: A computer device obtains a question text sequence.

The question text sequence is a sequence obtained by expressing a question in a text form. The question may be a question of a type such as a mathematical question or a chemical question.

For example, "Dan has 5 pens and 3 pencils, and Jessica has 4 more pens than her, but 2 less pencils. Question: How many pens does Jessica have in total?" is a question text sequence.

S104: The computer device maps a numeral in the question text sequence to an expression word.

The expression word is a word constituting an expression.

In an embodiment, the word constituting an expression may include an operator word, a variable word, a constant word, and the like. The operator word is a word representing an operator, and the operator may be an arithmetic operator, a connection operator, a relational operator, an assignment operator, a logical operator, or the like. The variable word is a word representing a variable, for example, a letter representing a variable. In this embodiment, the computer device may map the numeral in the question text sequence to a variable word.

For example, the numeral in the question text sequence exemplified in step S102 is mapped to an expression word, to obtain a question text sequence including the expression word: "Dan has n1 pens and n2 pencils, and Jessica has n3 more pens than her, but n4 less pencils. Question: How many pens does Jessica have in total?".

S106: The computer device encodes the question text sequence including the expression word into a semantic vector.

The semantic vector is a vector representing a semantic meaning of the question text sequence including the expression word. It may be understood that the semantic vector is a low-dimensional expression of a question text sequence including an expression word, and covers information of the entire question text sequence, and the semantic vector may be a sentence vector.

Specifically, the computer device may encode each word in the question text sequence including the expression word, and perform semantic expression on the question text sequence including the expression word according to information of each word to obtain a semantic vector of the question text sequence.

S108: The computer device decodes the semantic vector to generate a first expression, the first expression being an expression including the expression word.

Specifically, the computer device may decode the semantic vector to extract information from the semantic vector, determine according to the extracted information, determine an expression word that needs to be output during a decoding process, and generate by combination, according to the output expression word, an expression including the mapped expression word.

S110: The computer device replaces the expression word in the first expression with the mapped numeral, to obtain a second expression.

Specifically, the computer device may replace the expression word in the expression with the mapped numeral according to a mapping relationship between the numeral in the question text sequence and the expression word in step S104 to obtain a second expression capable of indicating the textual question.

For example, if the expression is $x=n1+n3+n2-n4$, n1, n2, n3, and n4 are replaced with mapped numerals 5, 3, 4, and 2, to obtain a mathematical expression $x=5+4+3-2$ after the replacement.

In the foregoing mathematical processing method for a textual question, a numeral in a question text sequence is mapped to an expression word, a question text sequence including the expression word is encoded into a semantic vector, an expression is generated by using the semantic vector including question information, and the expression word in the expression is replaced with the mapped numeral, so that the obtained mathematical expression, compared with a preset fixed expression template, is more accurate, is more likely to meet question-answering requirements, and further, improve intelligent question-answering accuracy.

Figure 2:
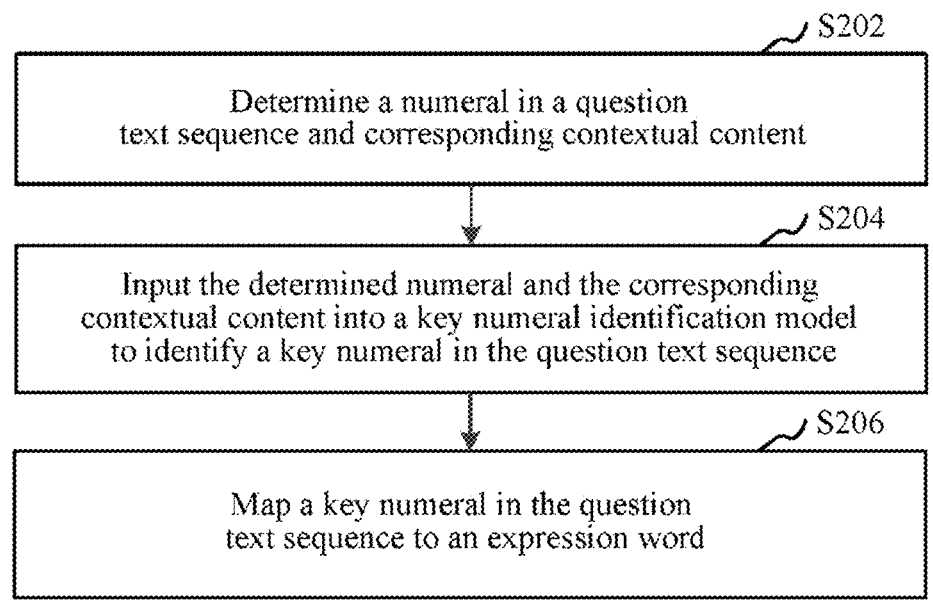
FIG. 2 is a schematic flowchart of an expression word mapping step in an embodiment.

As shown in FIG. 2, in an embodiment, step S104 (the expression word mapping step for short) includes the following steps.

S202: The computer device determines the numeral in the question text sequence and corresponding contextual content.

The contextual content is textual content before and after the numeral in the question text sequence. The textual content is textual content having a contextual relationship with the numeral.

For example, the question text sequence includes "if she has 3 shelves filled up with books", contextual content corresponding to the numeral 3 includes "if she has" and "shelves filled up with books".

In an embodiment, the computer device may select a length according to the preset contextual content, to determine a range of the contextual content that needs to be selected, and further, select contextual content of the numeral from the question text sequence according to the range of the contextual content that needs to be selected.

S204: The computer device inputs the determined numeral and the corresponding contextual content into a key numeral identification model to identify a key numeral in the question text sequence.

The key numeral is a numeral related to question-answering. The key numeral identification model is a module used to identify a key numeral in the question text sequence.

In an embodiment, the computer device can convert the numeral and the corresponding contextual content into a word vector by using the key digital recognition model, and convert the word vector by using a hidden layer and an activation function to obtain an identification tag. The computer device may determine whether the numeral is a key numeral according to the identification tag. The identification tag includes a "True" tag and a "False" tag, if the numeral is a key numeral, the tag is "True" correspondingly, and if the numeral is not a key numeral, the tag is "False" correspondingly. In an embodiment, the computer device may perform key numeral identification on the hidden layer based on a neural network unit, for example, a Long Short-Term Memory (LSTM) unit.

Figure 3:
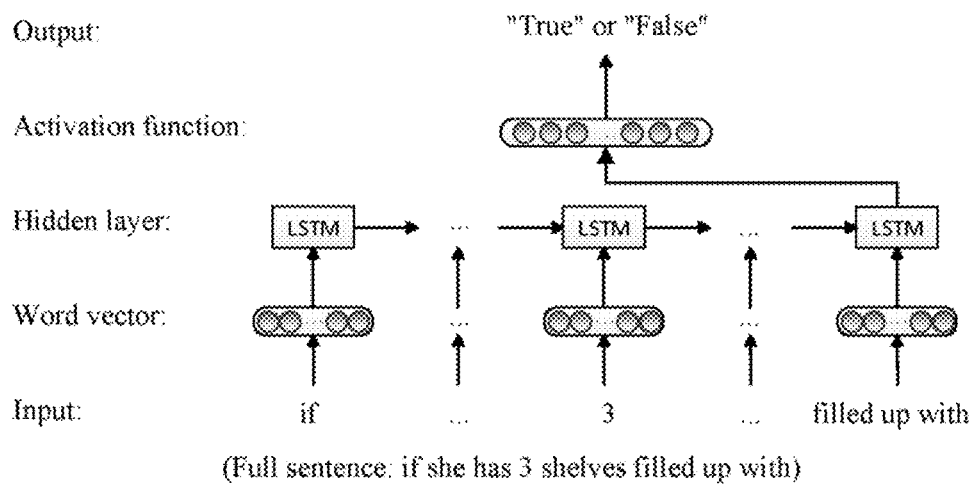
FIG. 3 is a schematic diagram of a key numeral identification model in an embodiment.

FIG. 3 is a schematic diagram of a key numeral identification model in an embodiment. The numeral 3 in the entire sentence and its contextual content are input into the key numeral identification model. The key numeral identification model performs conversion processing on the word vector by using the hidden layer and the activation function, to obtain an identification tag indicating "True" or "False".

In an embodiment, before step S204, the method further includes: obtaining, by the computer device, sample data including the numeral and a corresponding context and a corresponding identification tag, and performs machine learning model training according to the sample data and the identification tag, to obtain a key numeral identification model. That is, the computer device may obtain the key numeral identification model by training according to the collected sample data and the identification tag marked in advance.

S206: The computer device maps the key numeral in the question text sequence to an expression word.

Specifically, the computer device maps the key numeral in the question text sequence to an expression word without mapping a non-key numeral.

For example, the question text sequence is "1 day, 1 girl sorted out her 3 bookshelves to ensure that each shelf had 9 books, so how many books did she have?". If identified key numerals are 3 and 9, the key numerals 3 and 9 in the question text sequence are mapped to expression words, to obtain a question text sequence including the expression words, which is "1 day, 1 girl sorted out her n1 bookshelves to ensure that each shelf had n2 books, so how many books did she have?".

In the foregoing embodiment, the key numerals in the question text sequence are identified, only the key numerals are mapped to expression words without mapping all the numerals in the question text sequence to expression words, to reduce interference of non-key numerals on an expression generation process, so that the generated expression is more accurate, thereby improving question-answering accuracy.

In an embodiment, step S106 includes: converting, by the computer device, each word in the question text sequence including the expression word into a word vector, to obtain a word vector sequence; cyclically using, according to a sequential order of respective word vectors in the word vector sequence, a previous encoded value and a current word vector as input values of a current encoding process; and using a last encoded value as the semantic vector of the question text sequence including the expression word.

The word vector is a vector used to represent a word in a language in a mathematical form. For example, "microphone" is represented as [0 0 0 1 0 0 0 0 0 0 0 0 0 0 . . . ], which is a manner of representing language text as a word vector. It may be understood that which type of word vector the word in the language text is converted into is not limited herein provided that the word in the language text can be mathematically represented.

The word vector sequence includes respective converted words. The sequential order of the respective word vectors is the same as the sequential order in which the corresponding words appear in the question text sequence including the expression word. It may be understood that the word vector corresponding to the first word in the question text sequence ranks the highest in the word vector sequence.

For example, if the question text sequence including the expression word includes "Dan has n1 pens and n2 pencils . . . ", the word "Dan" corresponds to a word vector v1, "has" corresponds to a word vector v2, and "n1" corresponds to a word vector v3. . . , the word vectors included in the word vector sequence are sequentially v1, v2, v3 . . . .

Specifically, the computer device may encode the respective word vectors sequentially according to the sequential order of the respective word vectors in the word vector sequence, the previous encoded value and the current word vector are cyclically used as the input value of the current encoding process to perform current encoding until the last encoding process, and the last encoded value is used as the semantic vector of question text sequence including the expression word. It may be understood that because no previous encoding exists during the first encoding process, an input value during the first encoding process is the first word vector.

In an embodiment, the computer device may perform each encoding process by using an encoding unit, and each encoding process is performed by a corresponding encoding unit. The computer device cyclically uses the previous encoded value and the current word vector as input values of the current encoding process according to the sequential order of the respective word vectors in the word vector sequence to input them into the encoding unit of the current encoding process to perform encoding. The encoding unit may be a deep neural network unit, for example, may be gated recurrent unit (GRU).

Figure 4:
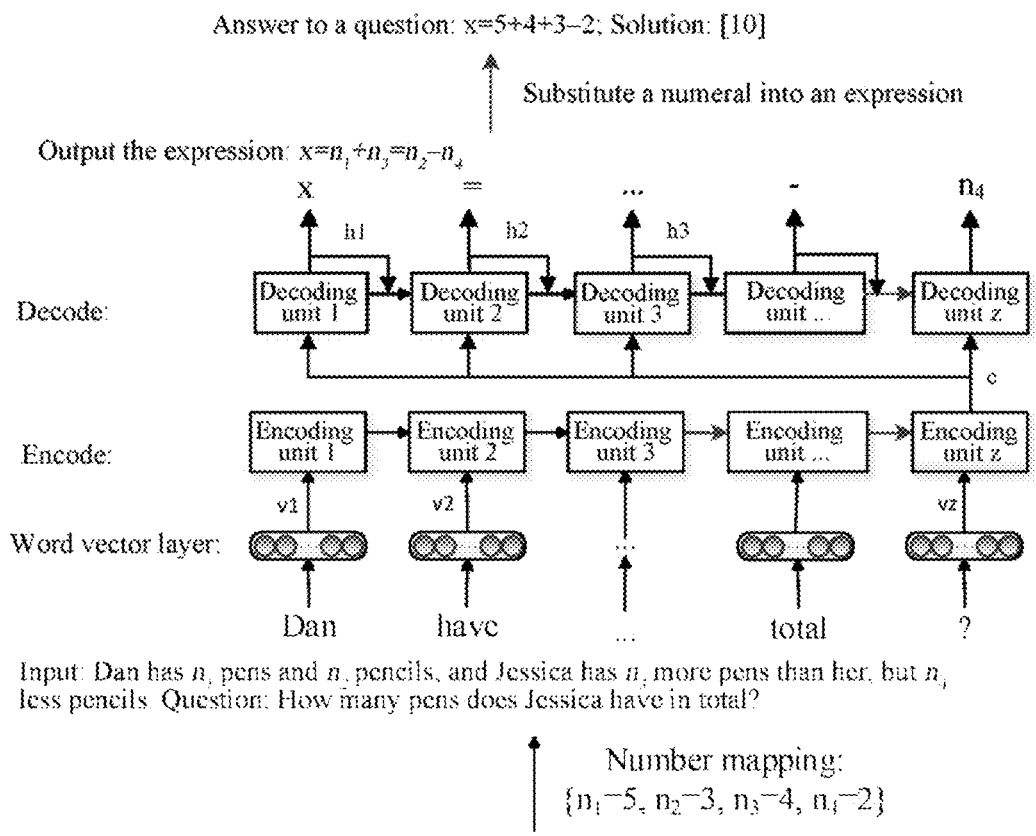
FIG. 4 is a schematic principle diagram of a mathematical processing method for a textual question in an embodiment.

FIG. 4 is a schematic principle diagram of a mathematical processing method for a textual question in an embodiment. As shown in FIG. 4, a value that is output after the word vector v1 is encoded by an encoding unit 1 and the word vector v2 together are used as input values used by an encoding unit 2 for encoding, a value encoded by the encoding unit 2 and the word vector v3 together are used as input values used by an encoding unit 3 for encoding . . . until a last encoding process is completed, and a last encoded value is used as a semantic vector c of the question text sequence including the expression word.

In the foregoing embodiment, respective words in the question text sequence including the expression word are converted into word vectors, and according to the sequential order of the respective word vectors, a previous vector encoded value and a current word vector are cyclically used as input values of the current encoding process; and a last encoded value is used as the semantic vector of the question text sequence including the expression word. Therefore, the generated semantic vector can more fully and completely include information of the question text sequence, and the expression generated based on the semantic vector is more accurate, thereby further improving question-answering accuracy.

Figure 5:
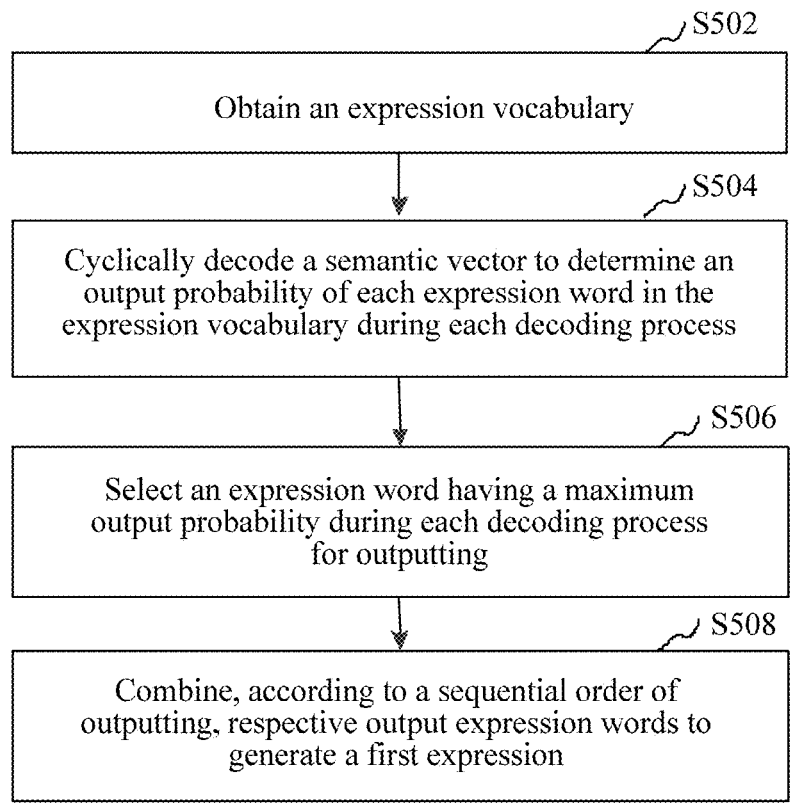
FIG. 5 is a schematic flowchart of an expression determining step in an embodiment.

As shown in FIG. 5, in an embodiment, step S108 (the expression determining step for short) specifically includes the following steps.

S502: The computer device obtains an expression vocabulary.

The expression vocabulary is a set constituted by expression words. The expression vocabulary may be in a table form or another form.

Specifically, the computer device may directly obtain a preset initial expression vocabulary. The computer device may alternatively obtain an expression vocabulary constituted by some expressions in the preset initial expression vocabulary. For example, if the initial expression vocabulary includes 100 expression words, the computer device may obtain an expression vocabulary including 50 expression words in the initial expression vocabulary in step S502.

S504: The computer device cyclically decodes the semantic vector to determine an output probability of each expression word in the expression vocabulary during each decoding process.

Decoding a semantic vector is analyzing and extracting information included in the semantic vector. It may be understood that if cyclically decoding is performed on a semantic vector, the semantic vector is subjected to a plurality of decoding processes.

Specifically, when cyclically decoding the semantic vector, the computer device outputs a decoding vector during each decoding process, and the computer device can determine, according to the decoding vector, an output probability of each expression word in the expression vocabulary during each decoding process. The decoding vector is a vector output by decoding the semantic vector. In an embodiment, the decoding vector is a vector output by decoding the semantic vector in a non-linear conversion manner.

S506: The computer device selects an expression word having a maximum output probability during each decoding process for outputting.

Specifically, during each decoding process, the computer device may select, according to an output probability of each expression word in the expression vocabulary, an expression word having a maximum output probability for outputting.

For example, the expression vocabulary includes 50 expression words. During each decoding process, each expression word has a corresponding output probability. The computer device may select an expression word having a maximum output probability from 50 expression words for output.

S508: The computer device combines, according to a sequential order of outputting, respective output expression words to generate the first expression.

The first expression includes respective mapped expression words, which are expression words after the numerals in the question text sequence are mapped.

It may be understood that during each decoding process, since the computer device selects an expression word having a maximum output probability for outputting, during a cyclically decoding process, the computer device may output a plurality of expression words. The computer device may combine, according to a sequential order in which the respective expression words are output, the respective output expression words to generate the first expression Referring to FIG. 4, in FIG. 4, the semantic vector c is decoded, an expression word output after each decoding process is an expression word having a maximum output probability during a current decoding process, and in FIG. 4, "x", "=", "n1" . . . "n4" are expression words output each time, and the output expression words are combined according to a sequential order of outputting, that is, an expression x=n1+n3+n2−n4 is generated.

In the foregoing embodiment, the semantic vector is cyclically decoded, an expression word having a maximum output probability is output according to decoding information, and an expression is generated by combination according to the output expression word rather than using a preset fixed expression template, so that the determined expression used for question-answering is more likely to meet question-answering requirements, and can improve intelligent question-answering accuracy. In addition, the expression that is generated by combination according to the output expression word having a maximum output probability is also more accurate, and further, improves question-answering accuracy.

In an embodiment, step S502 includes: identifying, by the computer device, a key numeral in the question text sequence; obtaining an expression vocabulary; and removing an expression word having no mapping relationship with the key numeral from expression words that have mapping relationships with numerals and that are in the initial expression vocabulary.

The key numeral is a numeral related to question-answering.

In an embodiment, the computer device may determine a numeral in the question text sequence and corresponding contextual content, and input the determined numeral and the corresponding contextual content into the key numeral identification model, to identify a key numeral in the question text sequence.

Specifically, the computer device may obtain an initial expression vocabulary, then determine expression words that have mapping relationships with numerals and that are in the initial expression vocabulary, and remove an expression word having no mapping relationship with the key numeral from expression words that have mapping relationships with numerals and that are in the initial expression vocabulary. It may be understood that in this case, the expression vocabulary in step S404 is an expression vocabulary after an expression word having no mapping relationship with the key numeral is removed from expression words that have mapping relationships with numerals and that are in the initial expression vocabulary. That is, the computer device only retains expression words having mapping relationships with the key numeral among the corresponding expression words having mapping relationships in the expression vocabulary, and removes the expression words having no mapping relationship with the key numeral.

For example, if there are 100 expression words in the expression vocabulary, 40 of the 100 expression words are expression words having mapping relationships with numerals, and 10 of the 40 expression words having mapping relationships with numerals are expressions words having mapping relationships with the key numerals identified in the question text sequence, the computer device can remove the remaining 30 expression words that have no mapping relationship with the key numerals, and the finally obtained expression vocabulary includes 70 expression words, including 10 expression words having mapping relationships with the key numeral. It may be understood that, a mapping relationship between a numeral and an expression word may be a fixed mapping relationship or a dynamic mapping relationship. The fixed mapping relationship indicates that a mapping relationship between a numeral and an expression is fixed and unchanged. The dynamic mapping relationship indicates that a mapping relationship between a numeral and an expression is dynamically changeable.

For example, assuming that key numeral identification is not performed, in the question text sequence "1 day, 1 girl sorted out her 4 bookshelves to ensure that each shelf had 9 books, so how many books did she have?", the first numeral "1" is mapped to n1, the second numeral "1" is mapped to n2, the third numeral "4" is mapped to n3, and the fourth numeral "9" is mapped to n4. It is identified that the key numerals are "3" and "9". In this case, the numeral "3" may be mapped to n1, and the numeral "9" may be mapped to n2. In the expression words that have mapping relationships with the numerals and that are in the expression vocabulary, expression words, other than n1 and n2, are expression words having the mapping relationships with the key numerals.

In the foregoing embodiment, the key numeral in the question text sequence is identified, and an expression word having no mapping relationship with the key numeral is removed from expression words that have mapping relationships with numerals and that are in the initial expression vocabulary, so that an output probability calculation amount is reduced, but because the key numeral are retain, an amount of information of the question text sequence is not affected, thereby greatly reducing occupied system resources while ensuring accuracy of expression word outputting.

In an embodiment, step S504 includes: decoding, by the computer device, the semantic vector and a previous output decoding vector to obtain a current output decoding vector and a corresponding weight matrix; and determining an output probability of each expression word in the expression vocabulary during a current decoding process according to the current output decoding vector and the corresponding weight matrix.

The decoding vector is a vector output by decoding the semantic vector. The corresponding weight matrix of the decoding vector includes a weight in each dimension of the decoding vector.

Specifically, during each decoding process, the computer device may perform a current decoding process on the semantic vector and the previous output decoding vector, to obtain a current output decoding vector and a corresponding weight matrix. Then, the computer device may determine an output probability of each expression word in the expression vocabulary during a current decoding process according to the current output decoding vector and the corresponding weight matrix as input of a probability distribution function. The computer device may use the semantic vector and the current output decoding vector as input of a next decoding process, and cyclically perform the decoding process several times according to the foregoing processing. It may be understood that during each decoding process, the semantic vector may be used as an input value. During the first decoding process, because there is no previous output decoding vector, the first decoding process is a decoding process directed to the semantic vector.

In an embodiment, the computer device may perform each decoding process by using a decoding unit, and each decoding process is performed by a corresponding decoding unit. The computer device may perform a current decoding process on the semantic vector and the previous output decoding vector by using a decoding unit, and decode the semantic vector and the current output decoding vector in a decoding unit that implements a next decoding process. The decoding unit may be a deep neural network unit, for example, a Long Short-Term Memory (LSTM) unit.

Referring to FIG. 4, during each decoding process, the semantic vector c and a decoding vector h1, h2, h3 . . . output during the previous decoding process are input into each decoding unit. Each decoding unit decodes the semantic vector and the decoding vector output during the previous decoding process. For example, a decoding unit 2 decodes the semantic vector c and a decoding vector h1 output by a decoding unit 1, and a decoding unit 3 decodes the semantic vector c and a decoding vector h2 output by the decoding unit 2.

In an embodiment, the computer device may directly determine an output probability of each expression word in the expression vocabulary during a current decoding process according to the current output decoding vector and the corresponding weight matrix. The computer device may alternatively determine, according to the product and a preset expression format condition, an output probability of each expression word in the expression vocabulary during a current decoding process.

In the foregoing embodiment, during each decoding process, it is not limited to decoding and analysis of information in a single dimension (such as a semantic vector), and an output probability of each expression word during a current outputting process is determined by combining a semantic vector and a decoding vector obtained in a previous decoding process. The semantic vector and the previous decoding vector process both include information in the question text sequence to some extent, so that the output probability of each expression word determined according to a combination of the two is more accurate, thereby making an expression combined based on the output expression words more accurate.

Figure 6:
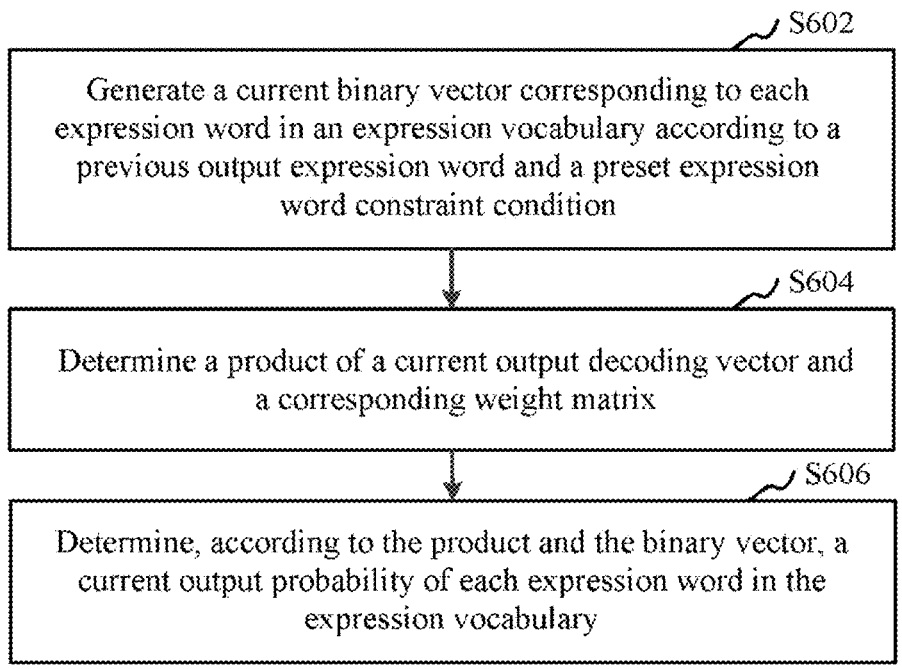
FIG. 6 is a schematic flowchart of an output probability determining step in an embodiment.

As shown in FIG. 6, in an embodiment, the determining an output probability of each expression word in the expression vocabulary during a current decoding process according to the current output decoding vector and the corresponding weight matrix (the output probability determining step for short) specifically includes the following steps.

S602: The computer device generates a current binary vector corresponding to each expression word in the expression vocabulary according to a previous output expression word and a preset expression word constraint condition.

The previous output expression word is an expression word output during the previous decoding process. The expression word constraint condition is a constraint condition between the outputting of the expression word during the previous decoding process and outputting of an expression word during a current decoding process. There are may be one or more sets of expression word constraint conditions, and one set of expression word constraint conditions may include one or more expression word constraint conditions.

It may be understood that the expression word constraint condition may be a format specification used to achieve an expression, where only an expression word that satisfies the expression word constraint condition between the expression word and the expression word of the previous decoding output satisfies the expression format, and an expression word that does not satisfy the expression word constraint condition between the expression word and the expression word of the previous decoding output does not satisfy the expression format.

For example, if r is an expression word output during a decoding process, rt−1 is an expression word output at a moment t−1 during this decoding process, and rt is an expression word output at a moment t during this decoding process, then an expression word constraint condition between rt−1 and rt may be that: if rt−1∈{+, *, /}, then rt∉{+, *, /,), =}; or, if rt−1 is "=", then rt∉{+, *, /,), =}, and so on.

A binary vector corresponding to each expression word in the expression vocabulary indicates that a position of the binary vector has a one-to-one correspondence with an expression word in the expression vocabulary, where the expression word corresponding to the representation "1" in the binary vector satisfies the expression word constraint condition, and the expression word corresponding to the representation "0" in the binary vector does not satisfy the expression word constraint condition.

Specifically, the computer device may determine, according to the previous output expression word and the preset expression word constraint condition, whether each expression word in the expression vocabulary satisfies an expression word constraint condition, if yes, set a value at a corresponding position in the binary vector to 1, and if not, set a value at a corresponding position in the binary vector to 0, thereby generating a binary vector during a current decoding process.

S604: The computer device determines a product of the current output decoding vector and the corresponding weight matrix.

Specifically, the computer device may multiply the current output decoding vector and the corresponding weight matrix, to obtain a product of the current output decoding vector and the corresponding weight matrix.

S606: The computer device determines, according to the product and the binary vector, a current output probability of each expression word in the expression vocabulary.

In an embodiment, the computer device may calculate a current output probability of each expression word in the expression vocabulary according to the following formula:

$$P(\hat{r}_t | h_t) = \frac{\rho_t \square \exp(h_t^T W)}{\rho_t \square \exp(\overline{h_t^T W})},$$

where $P(\hat{r}_t|h_t)$ represents an output probability of each expression word in the expression vocabulary at a moment t during a current decoding process; t represents a decoding moment; $\hat{n}$ represents each expression word in the expression vocabulary participating in the output probability calculation at a moment t during the current decoding process; $h_t$, ht is a decoding vector output at the moment t during the current decoding process; $\rho_t$ is a binary vector corresponding to each expression word in the expression vocabulary at the moment t during the current decoding process; $\square$ represents point multiplication; and W is a weight matrix in each dimension of the decoding vector $h_t$.

In the foregoing embodiment, when an output probability of an expression word is determined, determining an expression word constraint relationship is added, so that the output expression word is more likely to meet an expression format, thereby improving accuracy of expression format generation.

In an embodiment, before step S106, the method further includes: obtaining, by the computer device, a similarity between the question text sequence including the expression word and a prestored question text sequence; determining a highest similarity between the prestored question text sequence and the question text sequence including the expression word; and then performing the step of encoding the question text sequence including the expression term into a semantic vector when the highest similarity is less than a preset threshold.

The prestored question text sequence is a question text sequence that is stored in advance. The question text sequences that are stored in advance have been corresponded to generated expressions, and there is at least one prestored question text sequence.

Specifically, the computer device may directly obtain a similarity between the question text sequence including the expression word that has been determined and the prestored question text sequence. The computer device may alternatively analyze the similarity between the question text sequence including the expression word and the prestored question text sequence by using a text similarity algorithm, to obtain the similarity therebetween. In an embodiment, the computer device may calculate a similarity between the question text sequence including the expression word and the prestored question text sequence by using a Jaccard similarity algorithm.

The computer device may determine a similarity between the question text sequence including the expression word and each prestored question text sequence, to determine a highest similarity. The highest similarity is compared with a preset threshold, and when the highest similarity is less than the preset threshold, step S106 is performed again.

In an embodiment, the method further includes: when the highest similarity is greater than or equal to the preset threshold, obtaining, by the computer device, an expression corresponding to the prestored question text sequence having the highest similarity; and substituting the numeral in the question text sequence including the expression word into the obtained expression to output an answer to the question.

Specifically, the computer device stores a correspondence between a preset question text sequence and an expression, and when determining that the highest similarity is greater than or equal to the preset threshold, the computer device obtains, according to the correspondence, an expression corresponding to the prestored question text sequence having the highest similarity. Further, the computer device substitutes the numeral in the question text sequence including the expression word into the obtained expression to output an answer to the question.

In the foregoing embodiment, a similarity between the question text sequence including the expression word and the prestored question text sequence is determined, when the highest similarity is less than the preset threshold, expression generation calculation is performed again, and when the highest similarity is greater than or equal to the preset threshold, the expression corresponding to the prestored question text sequence having the highest similarity is directly used, to substitute the numeral into the expression to output an answer to the question, thereby preventing unnecessary expression determining calculations from wasting resources. In addition, performing question-answering according to the expression of the prestored question text sequence having the highest similarity greater than the preset threshold also ensures accuracy.

Figure 7:
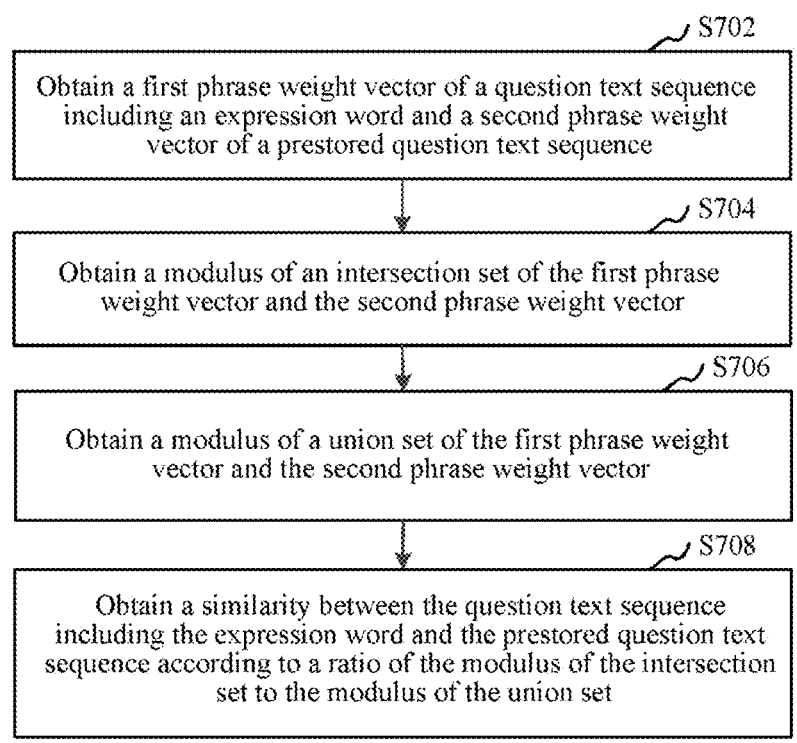
FIG. 7 is a schematic flowchart of a similarity obtaining step in an embodiment.

As shown in FIG. 7, in an embodiment, the obtaining a similarity between the question text sequence including the expression word and the prestored question text sequence (a similarity obtaining step for short) specifically includes the following steps.

S702: Obtain a first phrase weight vector of the question text sequence including the expression word and a second phrase weight vector of the prestored question text sequence.

The phrase weight vector is a vector constituted by weights of phrases in the question text sequence.

Specifically, the computer device may directly obtain a first phrase weight vector of the question text sequence including the expression word and a second phrase weight vector of a prestored question text sequence. The computer device may alternatively perform weight calculation on phases in the question text sequence and the prestored question text sequence to generate a corresponding first phrase weight vector and second phrase weight vector.

S704: Obtain a modulus of an intersection set of the first phrase weight vector and the second phrase weight vector.

S706: Obtain a modulus of a union set of the first phrase weight vector and the second phrase weight vector.

It may be understood that an intersection set or union set of vectors is also a vector. A modulus of a vector is a square root of a sum of squares of elements in the vector.

For example, if a vector a=[1, 0, 0, 2], and a vector b=[1, 0, 0, 9], an intersection set of the vector a and the vector b is a vector c=[1, 0, 0]. Therefore, a modulus of the vector c= $\sqrt{1^2+0^2+0^2}=1$.

S708: Obtain a similarity between the question text sequence including the expression word and the prestored question text sequence according to a ratio of the modulus of the intersection set to the modulus of the union set.

Specifically, the computer device may directly use the ratio of the modulus of the intersection set to the modulus of the union set as a similarity between the question text sequence including the expression word and the prestored question text sequence.

In an embodiment, the computer device may calculate a similarity between the question text sequence including the expression word and the prestored question text sequence according to the following formula:

$$J(P_T, Q) = \frac{|P_T \cap Q|}{|P_T \cup Q|} = \frac{|P_T \cap Q|}{|P_T| + |Q| - |P_T \cap Q|},$$

where $P_T$ is a first phrase weight vector of the question text sequence including the expression word; Q is a second phrase weight vector of the prestored question text sequence; $J(P_T,Q)$ is a similarity between the question text sequence including the expression word and a prestored question text sequence; $P_T \cap Q$ is a modulus of an intersection set of the first phrase weight vector and the second phrase weight vector; $|P_T \cap Q|$ is a modulus of an intersection set of the first phrase weight vector and the second phrase weight vector; $P_T \cup Q$ is a modulus of a union set of the first phrase weight vector and the second phrase weight vector; $|P_T \cup Q|$ is a modulus of a union set of the first phrase weight vector and the second phrase weight vector; $|P_T|$ is a modulus of the first phrase weight vector; and $|Q|$ is a modulus of the second phrase weight vector.

In the foregoing embodiment, a similarity between the question text sequence including the expression word and the prestored question text sequence is determined according to the first phrase weight vector of the question text sequence including the expression word and the second phrase weight vector of the prestored question text sequence, to ensure accuracy of the determined similarity, so that a result of threshold comparison based on the similarity is more accurate.

In an embodiment, the obtaining a first phrase weight vector of the question text sequence including the expression word includes: obtaining, by the computer device, a word frequency of each included phrase in the question text sequence including the expression word; determining a weight of each phrase according to the word frequency, a total quantity of prestored question text sequences, and a quantity of prestored question text sequences including the phrase; and forming the first phrase weight vector of the question text sequence including the expression word according to the weight of the phrase.

The word frequency indicates a quantity of times that each phase in the question text sequence including the expression word appears in the question text sequence. The prestored question text sequence is a question text sequence stored in advance. The quantity of prestored question text sequences including each phrase indicates a quantity of prestored question text sequences including a phrase on which phrase weight calculation needs to be performed.

For example/such as, "book" appears three times in the question text sequence including the expression word, and there are 50 prestored question text sequences. If the phrase "book" appears three times in the question text sequence, and 40 prestored question text sequence among 50 prestored question text sequences include the phrase "book", a word frequency of the phrase "book" in the question text sequence is 3, and a quantity of prestored question text sequences including the phrase "book" is 40.

In an embodiment, the determining a weight of each phrase according to the word frequency, a total quantity of prestored question text sequences, and a quantity of prestored question text sequences including the phrase includes: determining a ratio of the total quantity of prestored question text sequences to the quantity of prestored question text sequences including the phrase; and determining a weight of the phrase according to a product of the word frequency and the ratio.

Specifically, the computer device may directly use a product of the word frequency and the ratio as a weight of the phrase. The computer device may alternatively determine a weight of each phrase according to a combination of the product of the word frequency and the ratio and a weight adjustment coefficient or a weight adjustment function.

In an embodiment, the computer device may calculate a weight of each phrase based on the product of the word frequency and the ratio according to the following the formula:

$$W_{m,d} = tf_{m,d} * \frac{|D|}{|d \in D | m \in d|},$$

where d represents a question text sequence including an expression word; m represents a phrase included in the question text sequence d; $W_{m,d}$ represents a weight of the phrase m in the question text sequence d; $tf_{m,d}$ represents a word frequency of the phrase m in the question text sequence d; $|D|$ is a total quantity of prestored question text sequences; and $|d \in D | t \in d|$ represents a quantity of prestored question text sequences including phrase m.

With reference to the foregoing example, according to the weight calculation formula, a weight of the phrase "book"=3*50/40=3.75.

Further, the computer device may form the first phrase weight vector of the question text sequence including the expression word according to the weight of the phrase. For example, if the question text sequence includes 10 phrases, a 10-dimensional phrase weight vector, that is, a phrase weight vector of the question text sequence is formed according to a weight of each phrase.

It may be understood that the second phrase weight vector of the prestored question text sequence may alternatively be determined according to the foregoing method.

In the foregoing embodiment, a weight determined according to a word frequency of a phrase in the question text sequence, a total quantity of prestored question text sequences, and a quantity of prestored question text sequences including the phase can accurately reflect importance of the phrase, so that the weight of the phrase is more accurate. Further, the first phrase weight vector of the question text sequence including the expression word formed according to a weight of each phrase can reflect a textual feature of the question text sequence more accurately, so that text similarity calculation based on the first phrase weight vector is also more accurate.

In an embodiment, the method further includes: outputting an answer to the question according to the expression where the expression word has been replaced with the numeral (that is, the second expression).

In an embodiment, the computer device may perform calculation according to the second expression, to obtain an answer to the question and output the answer. For example, if an expression in which an expression word is replaced with a numeral is x=5+4+3−2, it is obtained that an answer to the question is 10.

In an embodiment, the computer device may alternatively directly output the second expression as an answer to the question. For example, for a question about a balance chemical equation, an expression is a chemical formula, a variable word representing a coefficient in the chemical formula is replaced with a reflected numeral, to obtain a balanced chemical formula, which is an answer to the question.

In the foregoing embodiment, the second expression is an expression generated by performing mathematical conversion according to semantic information of the question text sequence, so that accuracy of the generated expression is ensured, and further, an answer to the question output according to the expression is more accurate.

Figure 8:
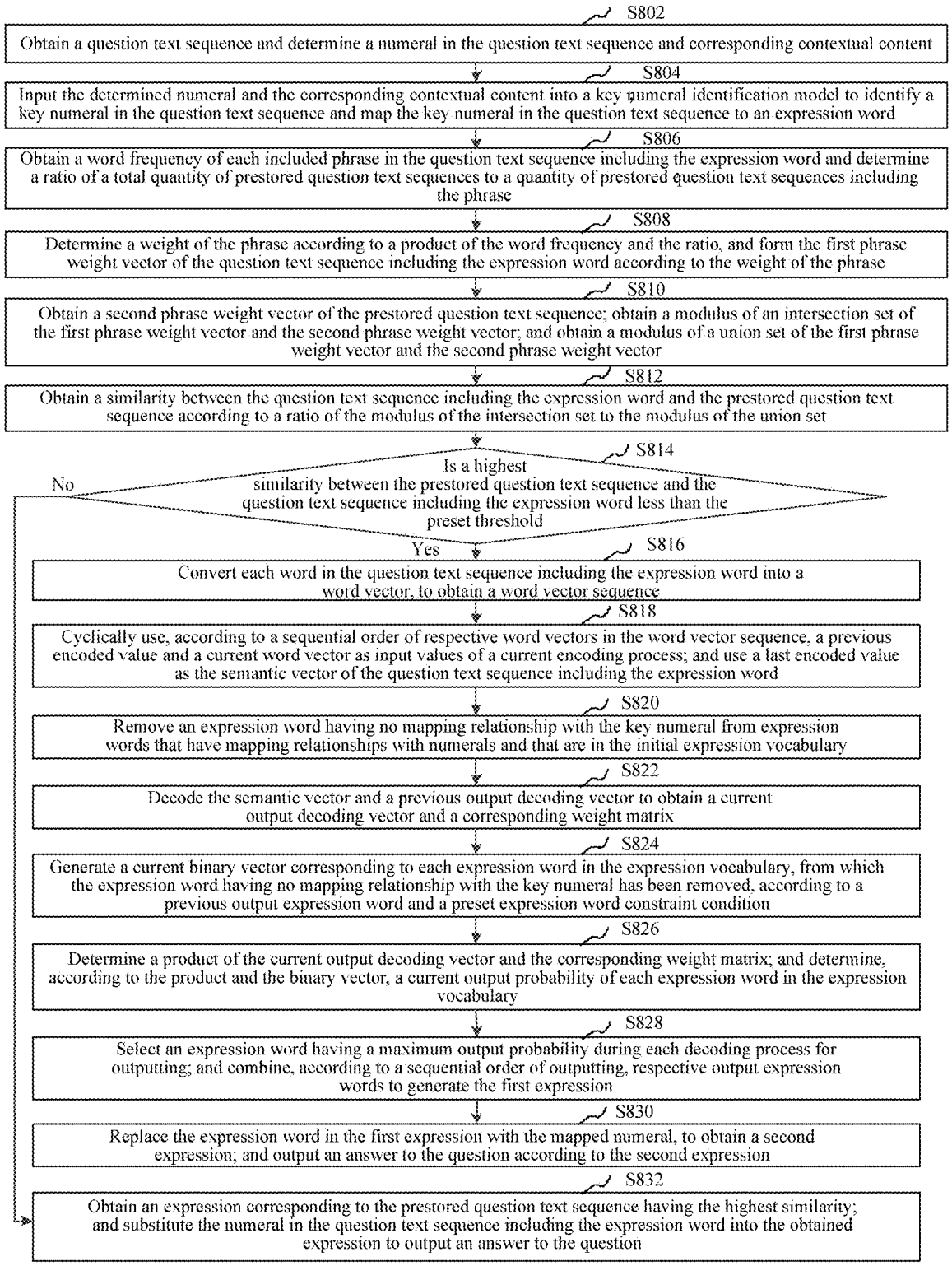
FIG. 8 is a schematic flowchart of a mathematical processing method for a textual question in another embodiment.

As shown in FIG. 8, in an embodiment, another mathematical processing method for a textual question is provided. The method specifically includes the following steps:

S802: A computer device obtains a question text sequence and determines a numeral in the question text sequence and corresponding contextual content.

S804: The computer device inputs the determined numeral and the corresponding contextual content into a key numeral identification model to identify a key numeral in the question text sequence and maps the key numeral in the question text sequence to an expression word.

S806: The computer device obtains a word frequency of each included phrase in the question text sequence including the expression word and determines a ratio of a total quantity of prestored question text sequences to a quantity of prestored question text sequences including the phrase.

S808: The computer device determines a weight of the phrase according to a product of the word frequency and the ratio, and forms the first phrase weight vector of the question text sequence including the expression word according to the weight of the phrase.

In an embodiment, a weight of each phrase is calculated according to the following formula:

$$W_{m,d} = tf_{m,d} * \frac{|D|}{|d \in D | m \in d|},$$

where d represents a question text sequence including an expression word; m represents a phrase included in the question text sequence d; $W_{m,d}$ represents a weight of the phrase m in the question text sequence d; $tf_{m,d}$ represents a word frequency of the phrase m in the question text sequence d; |D| is a total quantity of prestored question text sequences; and $|d \in D | t \in d|$ represents a quantity of prestored question text sequences including phrase m.

S810: The computer device obtains a second phrase weight vector of the prestored question text sequence; obtains a modulus of an intersection set of the first phrase weight vector and the second phrase weight vector; and obtains a modulus of a union set of the first phrase weight vector and the second phrase weight vector.

S812: The computer device obtains a similarity between the question text sequence including the expression word and the prestored question text sequence according to a ratio of the modulus of the intersection set to the modulus of the union set.

S814: The computer device determines whether a highest similarity between the prestored question text sequence and the question text sequence including the expression word is less than the preset threshold, if yes, performs step S816, and if not, performs step S832.

S816: The computer device converts each word in the question text sequence including the expression word into a word vector, to obtain a word vector sequence.

S818: The computer device cyclically uses, according to a sequential order of respective word vectors in the word vector sequence, a previous encoded value and a current word vector as input values of a current encoding process; and uses a last encoded value as the semantic vector of the question text sequence including the expression word.

S820: The computer device removes an expression word having no mapping relationship with the key numeral from expression words that have mapping relationships with numerals and that are in the initial expression vocabulary.

S822: The computer device decodes the semantic vector and a previous output decoding vector to obtain a current output decoding vector and a corresponding weight matrix.

S824: The computer device generates a current binary vector corresponding to each expression word in the expression vocabulary, from which the expression word having no mapping relationship with the key numeral has been removed, according to a previous output expression word and a preset expression word constraint condition.

S826: The computer device determines a product of the current output decoding vector and the corresponding weight matrix; and determines, according to the product and the binary vector, a current output probability of each expression word in the expression vocabulary.

In an embodiment, a current output probability of each expression word in the expression vocabulary is calculated according to the following formula:

$$P(\hat{r}_t | h_t) = \frac{\rho_t \square \exp(h_t^T W)}{\sum \rho_t \square \exp(h_t^T W)},$$

where $P(\hat{r}_t|h_t)$ represents an output probability of each expression word in the expression vocabulary at a moment t during a current decoding process; t represents a decoding moment; n̂ represents each expression word in the expression vocabulary participating in the output probability calculation at a moment t during the current decoding process; $h_t$ ht is a decoding vector output at the moment t during the current decoding process; $\rho_t$ is a binary vector corresponding to each expression word in the expression vocabulary at the moment t during the current decoding process; □ represents point multiplication; and W is a weight matrix in each dimension of the decoding vector $h_t$.

S828: The computer device selects an expression word having a maximum output probability during each decoding process for outputting; and combines, according to a sequential order of outputting, respective output expression words to generate the first expression.

S830: Replace the expression word in the first expression with the mapped numeral, to obtain a second expression; and output an answer to the question according to the second expression.

S832: Obtain an expression corresponding to the prestored question text sequence having the highest similarity; and substitute the numeral in the question text sequence including the expression word into the obtained expression to output an answer to the question.

In the foregoing mathematical processing method for a textual question, a numeral in a question text sequence is mapped to an expression word, a question text sequence including the expression word is encoded into a semantic vector, an expression is generated by using the semantic vector including question information, and the expression word in the expression is replaced with the mapped numeral, so that the obtained mathematical expression, compared with a preset fixed expression template, is more accurate, is more likely to meet question-answering requirements, and further, improve intelligent question-answering accuracy.

Second, the key numerals in the question text sequence are identified, only the key numerals are mapped to expression words without mapping all the numerals in the question text sequence to expression words, to reduce interference of non-key numerals on an expression generation process, so that the generated expression is more accurate, thereby improving question-answering accuracy.

Then, respective words in the question text sequence including the expression word are converted into word vectors, and according to the sequential order of the respective word vectors, a previous vector encoded value and a current word vector are cyclically used as input values of the current encoding process; and a last encoded value is used as the semantic vector of the question text sequence including the expression word. Therefore, the generated semantic vector can more fully and completely include information of the question text sequence, and the expression generated based on the semantic vector is more accurate, thereby further improving question-answering accuracy.

Subsequently, the semantic vector is cyclically decoded, an expression word having a maximum output probability is output according to decoding information, and an expression is generated by combination according to the output expression word rather than using a preset fixed expression template, so that the determined expression used for question-answering is more likely to meet question-answering requirements, and can improve intelligent question-answering accuracy. In addition, the expression that is generated by combination according to the output expression word having a maximum output probability is also more accurate, and further, improves question-answering accuracy.

Finally, a similarity between the question text sequence including the expression word and the prestored question text sequence is determined, when the highest similarity is less than the preset threshold, expression generation calculation is performed again, and when the highest similarity is greater than or equal to the preset threshold, the expression corresponding to the prestored question text sequence having the highest similarity is directly used, to substitute the numeral into the expression to output an answer to the question, thereby preventing unnecessary expression determining calculations from wasting resources. In addition, performing question-answering according to the expression of the prestored question text sequence having the highest similarity greater than the preset threshold also ensures accuracy.

Figure 9:
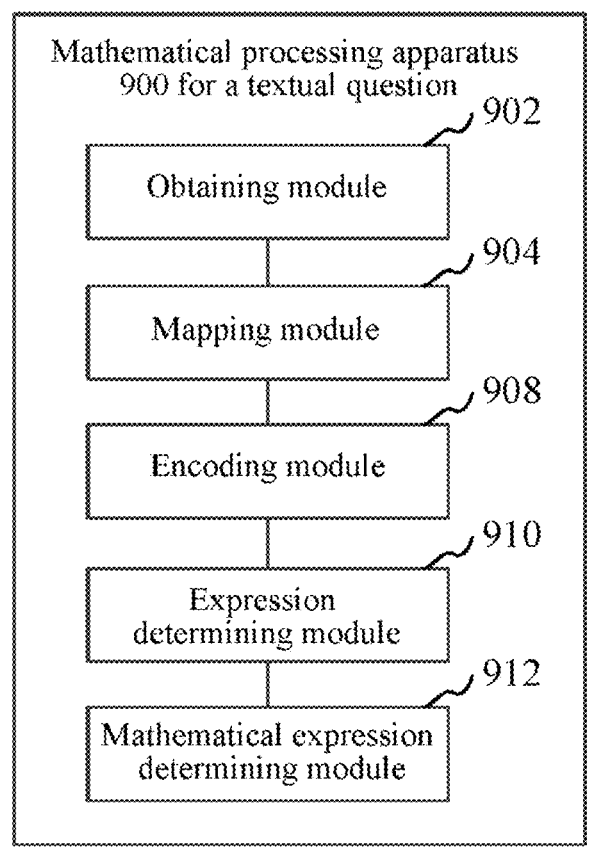
FIG. 9 is a block diagram of a mathematical processing apparatus for a textual question in an embodiment.

As shown in FIG. 9, in an embodiment, a mathematical processing apparatus 900 for a textual question is provided. The apparatus includes: an obtaining module 902, a mapping module 904, an encoding module 908, an expression determining module 910, and a mathematical expression determining module 912.

The obtaining module 902 is configured to obtain a question text sequence.

The mapping module 904 is configured to map a numeral in the question text sequence to an expression word.

The encoding module 908 is configured to encode the question text sequence including the expression word into a semantic vector.

The expression determining module 910 is configured to decode the semantic vector to generate a first expression, the first expression being an expression including the expression word.

The mathematical expression outputting module 912 is configured to replace the expression word in the first expression with the mapped numeral, to obtain a second expression.

Figure 10:
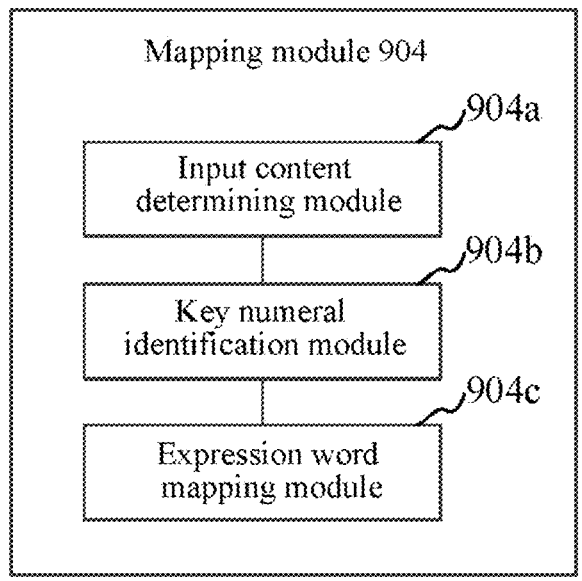
FIG. 10 is a block diagram of a mapping module in an embodiment.

As shown in FIG. 10, in an embodiment, the mapping module 904 includes:

an input content determining module 904a, configured to determine the numeral in the question text sequence and corresponding contextual content;

a key numeral identification module 904b, configured to input the determined numeral and the corresponding contextual content into a key numeral identification model to identify a key numeral in the question text sequence; and an expression word mapping module 904c, configured to map the key numeral in the question text sequence to an expression word.

In an embodiment, the encoding module 908 is further configured to: convert each word in the question text sequence including the expression word into a word vector, to obtain a word vector sequence; cyclically use, according to a sequential order of respective word vectors in the word vector sequence, a previous encoded value and a current word vector as input values of a current encoding process; and use a last encoded value as the semantic vector of the question text sequence including the expression word.

Figure 11:
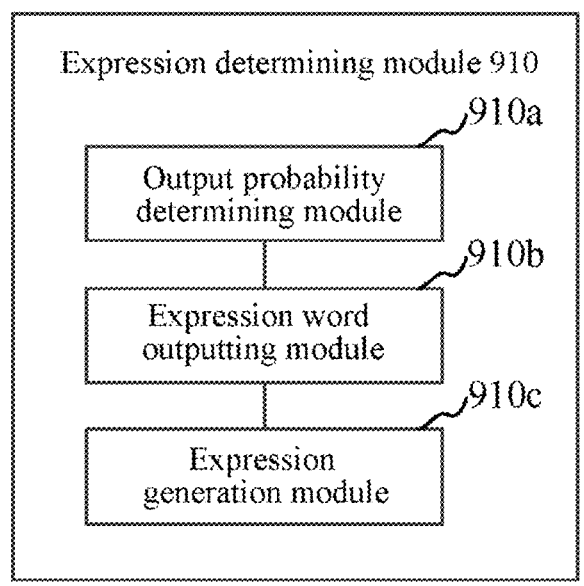
FIG. 11 is a block diagram of an expression determining module in an embodiment.

As shown in FIG. 11, in an embodiment, the expression determining module 910 includes:

an output probability determining module 910a, configured to obtain an expression vocabulary; and cyclically decode the semantic vector to determine an output probability of each expression word in the expression vocabulary during each decoding process;

an expression word outputting module 910b, configured to select an expression word having a maximum output probability during each decoding process for outputting; and an expression generation module 910c, configured to combine, according to a sequential order of outputting, respective output expression words to generate the first expression.

In an embodiment, the output probability determining module 910a is further configured to identify a key numeral in the question text sequence; obtain an expression vocabulary; and remove an expression word having no mapping relationship with the key numeral from expression words that have mapping relationships with numerals and that are in the initial expression vocabulary.

In an embodiment, the output probability determining module 910a is further configured to decode the semantic vector and a previous output decoding vector to obtain a current output decoding vector and a corresponding weight matrix; and determine an output probability of each expression word in the expression vocabulary during a current decoding process according to the current output decoding vector and the corresponding weight matrix.

In an embodiment, the output probability determining module 910a is further configured to generate a current binary vector corresponding to each expression word in the expression vocabulary according to a previous output expression word and a preset expression word constraint condition; determine a product of the current output decoding vector and the corresponding weight matrix; and determine, according to the product and the binary vector, a current output probability of each expression word in the expression vocabulary.

In an embodiment, the output probability determining module 910a is further configured to calculate a current output probability of each expression word in the expression vocabulary according to the following formula:

$$P(\hat{r}_t \mid h_t) = \frac{\rho_t \square \exp(h_t^T W)}{\sum \rho_t \square \exp(h_t^T W)},$$

where $P(\hat{r}_t|h_t)$ represents an output probability of each expression word in the expression vocabulary at a moment t during a current decoding process; t represents a decoding moment; ñ represents each expression word in the expression vocabulary participating in the output probability calculation at a moment t during the current decoding process; $h_t$, ht is a decoding vector output at the moment t during the current decoding process; $\rho_t$ is a binary vector corresponding to each expression word in the expression vocabulary at the moment t during the current decoding process; □ represents point multiplication; and W is a weight matrix in each dimension of the decoding vector $h_t$.

Figure 12:
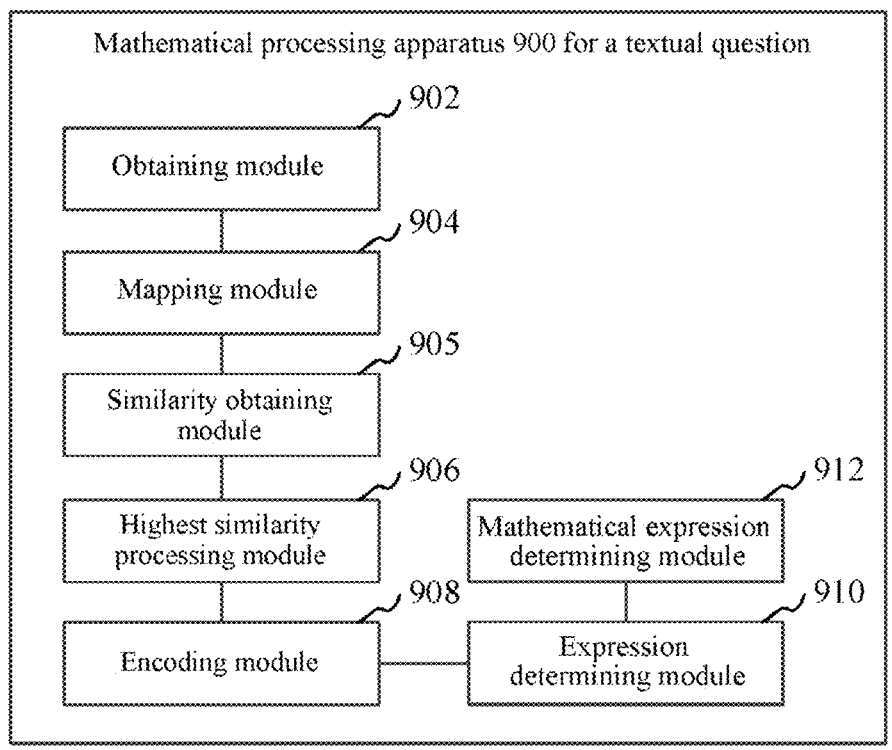
FIG. 12 is a block diagram of a mathematical processing apparatus for a textual question in another embodiment.

As shown in FIG. 12, in an embodiment, the apparatus 900 further includes:

a similarity obtaining module 905, configured to obtain a similarity between the question text sequence including the expression word and a prestored question text sequence;

a highest similarity processing module 906, configured to determine a highest similarity between the prestored question text sequence and the question text sequence including the expression word; and then notify, when the highest similarity is less than a preset threshold, the encoding module 908 of encoding the question text sequence including the expression term into a semantic vector.

In an embodiment, the highest similarity processing module 906 is further configured to notify, when the highest similarity is greater than or equal to the preset threshold, the expression determining module 910 of obtaining an expression corresponding to the prestored question text sequence having the highest similarity; and substitute the numeral in the question text sequence including the expression word into the obtained expression to output an answer to the question.

In an embodiment, the similarity obtaining module 905 is further configured to obtain a first phrase weight vector of the question text sequence including the expression word and a second phrase weight vector of the prestored question text sequence; obtain a modulus of an intersection set of the first phrase weight vector and the second phrase weight vector; and obtain a modulus of a union set of the first phrase weight vector and the second phrase weight vector; and obtain a similarity between the question text sequence including the expression word and the prestored question text sequence according to a ratio of the modulus of the intersection set to the modulus of the union set.

In an embodiment, the similarity obtaining module 905 is further configured to obtain a word frequency of each included phrase in the question text sequence including the expression word; determine a weight of each phrase according to the word frequency, a total quantity of prestored question text sequences, and a quantity of prestored question text sequences including the phrase; and form the first phrase weight vector of the question text sequence including the expression word according to the weight of the phrase.

In an embodiment, the similarity obtaining module 905 is further configured to determine a weight of each phrase according to the word frequency, a total quantity of prestored question text sequences, and a quantity of prestored question text sequences including the phrase; and determine a weight of the phrase according to a product of the word frequency and the ratio.

In an embodiment, the similarity obtaining module 905 is further configured to calculate a weight of each phrase according to the following formula:

$$W_{m,d} = tf_{m,d} * \frac{|D|}{|d \in D \mid m \in d|},$$

where d represents a question text sequence including an expression word; m represents a phrase included in the question text sequence d; $W_{m,d}$ represents a weight of the phrase m in the question text sequence d; $tf_{m,\ d}$ represents a word frequency of the phrase m in the question text sequence d; |D| is a total quantity of prestored question text sequences; and $|d \in D|t \in d|$ represents a quantity of prestored question text sequences including phrase m.

In an embodiment, the mathematical expression determining module 912 is further configured to output an answer to the question according to the second expression.

Figure 13:
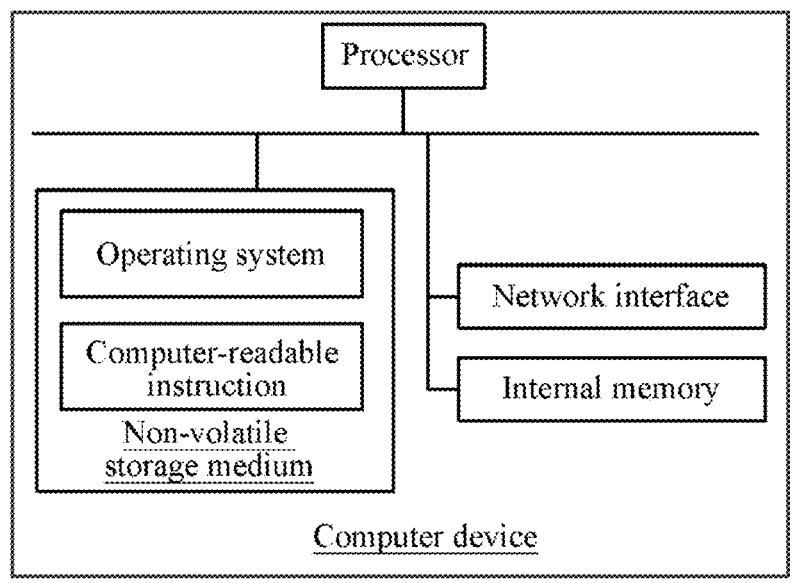
FIG. 13 is a schematic diagram of an inner structure of a computer device in an embodiment.

FIG. 13 is a schematic diagram of an inner structure of a computer device in an embodiment. The computer device may be a terminal or a server. The terminal may be a personal computer or a mobile electronic device, including at least one of a mobile phone, a tablet computer, a personal digital assistant, wearable device, or the like. The server may be an independent server or implemented by using a server cluster including multiple physical servers. Referring to FIG. 13, the electronic device includes a processor, a non-volatile storage medium, an internal memory, and a network interface that are connected through a system bus. The non-volatile storage medium of the computer device may store an operating system and computer-readable instructions. The computer-readable instructions, when executed, may cause the processor to perform a mathematical processing method for a textual question. The processor of the computer device is configured to provide calculation and control capabilities, to support running of the entire computer device. The internal memory may store computer-readable instructions. When executed by the processor, the computer-readable instructions may cause the processor to perform a mathematical processing method for a textual question. The network interface of the computer device is configured to perform network communication.

A person skilled in the art may understand that, the structure shown in FIG. 13 is merely a block diagram of a partial structure related to the solutions of this application, and does not constitute a limitation to the computer device to which the solutions of this application are applied, and a specific computer device may include more or fewer components than those shown in the figure, or some components may be combined, or a different component deployment may be used.

In an embodiment, the mathematical processing apparatus for a textual question provided by this application may be implemented in a form of a computer program. The computer program may run on the computer device shown in FIG. 13, the non-volatile storage medium of the computer device may store respective program modules, such as the obtaining module 902, the mapping module 904, the encoding module 908, the expression determining module 910, and the mathematical expression determining module 912 shown in FIG. 9, constituting the mathematical processing apparatus for a textual question. Each program the module includes computer-readable instructions. The computer-readable instructions are used to cause the computer device to perform steps in the mathematical processing method for a textual question of each embodiment of this application described in this specification. For example, the computer device may obtain a question text sequence by using the obtaining module 902 in the mathematical processing apparatus 900 for a textual question shown in FIG. 9, map a numeral in the question text sequence to an expression word by using the mapping module 904, and encode the question text sequence including the expression word by using the encoding module 908. The computer device decodes the semantic vector by using the expression determining module 910 to generate an expression including the expression word, and replaces the expression word in the expression with the mapped numeral by using the mathematical expression determining module 912.

In an embodiment, a computer device is provided, including: a memory and a processor, the memory storing computer-readable instructions, and the computer-readable instructions, when executed by the processor, causing the processor to perform the following steps:

obtaining a question text sequence;

mapping a numeral in the question text sequence to an expression word;

encoding the question text sequence including the expression word into a semantic vector;

decoding the semantic vector to generate a first expression, the first expression being an expression including the expression word; and replacing the expression word in the first expression with the mapped numeral, to obtain a second expression.

In some embodiments, the computer-readable instructions, when executed by the processor, further cause the processor to perform the following steps:

determining the numeral in the question text sequence and corresponding contextual content;

inputting the determined numeral and the corresponding contextual content into a key numeral identification model to identify a key numeral in the question text sequence; and mapping the key numeral in the question text sequence to an expression word.

In some embodiments, the computer-readable instructions, when executed by the processor, further cause the processor to perform the following steps:

converting each word in the question text sequence including the expression word into a word vector, to obtain a word vector sequence;

cyclically using, according to a sequential order of respective word vectors in the word vector sequence, a previous encoded value and a current word vector as input values of a current encoding process; and using a last encoded value as the semantic vector of the question text sequence including the expression word.

In some embodiments, the computer-readable instructions, when executed by the processor, cause the processor to perform the following steps:

obtaining an expression vocabulary;

cyclically decoding the semantic vector to determine an output probability of each expression word in the expression vocabulary during each decoding process;

selecting an expression word having a maximum output probability during each decoding process for outputting; and combining, according to a sequential order of outputting, respective output expression words to generate the first expression.

In some embodiments, the computer-readable instructions, when executed by the processor, cause the processor to perform the following steps:

identifying a key numeral in the question text sequence;

obtaining an initial expression vocabulary; and removing an expression word having no mapping relationship with the key numeral from expression words that have mapping relationships with numerals and that are in the initial expression vocabulary.

In some embodiments, the computer-readable instructions, when executed by the processor, cause the processor to perform the following steps:

decoding the semantic vector and a previous output decoding vector to obtain a current output decoding vector and a corresponding weight matrix; and determining an output probability of each expression word in the expression vocabulary during a current decoding process according to the current output decoding vector and the corresponding weight matrix.

In some embodiments, the computer-readable instructions, when executed by the processor, cause the processor to perform the following steps:

generating a current binary vector corresponding to each expression word in the expression vocabulary according to a previous output expression word and a preset expression word constraint condition;

determining a product of the current output decoding vector and the corresponding weight matrix; and determining, according to the product and the binary vector, a current output probability of each expression word in the expression vocabulary.

In some embodiments, the computer-readable instructions, when executed by the processor, further cause the processor to perform the following steps:

obtaining a similarity between the question text sequence including the expression word and a prestored question text sequence;

determining a highest similarity between the prestored question text sequence and the question text sequence including the expression word; and then performing the step of encoding the question text sequence including the expression term into a semantic vector when the highest similarity is less than a preset threshold.

In some embodiments, the computer-readable instructions, when executed by the processor, cause the processor to perform the following steps:

when the highest similarity is greater than or equal to the preset threshold, obtaining an expression corresponding to the prestored question text sequence having the highest similarity; and substituting the numeral in the question text sequence including the expression word into the obtained expression to output an answer to the question.

In some embodiments, the computer-readable instructions, when executed by the processor, cause the processor to perform the following steps:

obtaining a first phrase weight vector of the question text sequence including the expression word and a second phrase weight vector of the prestored question text sequence;

obtaining a modulus of an intersection set of the first phrase weight vector and the second phrase weight vector;

obtaining a modulus of a union set of the first phrase weight vector and the second phrase weight vector; and obtaining a similarity between the question text sequence including the expression word and the prestored question text sequence according to a ratio of the modulus of the intersection set to the modulus of the union set.

In some embodiments, the computer-readable instructions, when executed by the processor, cause the processor to perform the following steps:

obtaining a word frequency of each included phrase in the question text sequence including the expression word;

determining a weight of each phrase according to the word frequency, a total quantity of prestored question text sequences, and a quantity of prestored question text sequences including the phrase; and forming the first phrase weight vector of the question text sequence including the expression word according to the weight of the phrase.

In some embodiments, the computer-readable instructions, when executed by the processor, cause the processor to perform the following step:

outputting an answer to the question according to the second expression.

In an embodiment, a storage medium storing computer-readable instructions is provided, the computer-readable instructions, when executed by one or more processors, causing the one or more processors to perform the following steps:

obtaining a question text sequence;

mapping a numeral in the question text sequence to an expression word;

encoding the question text sequence including the expression word into a semantic vector;

decoding the semantic vector, to generate an expression including the expression word;

replacing the expression word in the expression with the mapped numeral.

In an embodiment, the mapping a numeral in the question text sequence to an expression word includes:

determining the numeral in the question text sequence and corresponding contextual content;

inputting the determined numeral and the corresponding contextual content into a key numeral identification model to identify a key numeral in the question text sequence; and mapping a numeral in the question text sequence to an expression word.

In an embodiment, the encoding the question text sequence including the expression word into a semantic vector includes:

converting each word in the question text sequence including the expression word into a word vector, to obtain a word vector sequence;

cyclically using, according to a sequential order of respective word vectors in the word vector sequence, a previous encoded value and a current word vector as input values of a current encoding process; and using a last encoded value as the semantic vector of the question text sequence including the expression word.

In an embodiment, the decoding the semantic vector, to generate an expression including the expression word includes:

obtaining an expression vocabulary;

cyclically decoding the semantic vector to determine an output probability of each expression word in the expression vocabulary during each decoding process;

selecting an expression word having a maximum output probability during each decoding process for outputting; and combining, according to a sequential order of outputting, respective output expression words to generate the expression including the mapped expression word.

In an embodiment, the obtaining an expression vocabulary includes:

identifying a key numeral in the question text sequence;

obtaining an initial expression vocabulary; and removing an expression word having no mapping relationship with the key numeral from expression words that have mapping relationships with numerals and that are in the initial expression vocabulary.

In an embodiment, the cyclically decoding the semantic vector to determine an output probability of each expression word in the expression vocabulary during each decoding process includes:

decoding the semantic vector and a previous output decoding vector to obtain a current output decoding vector and a corresponding weight matrix; and determining an output probability of each expression word in the expression vocabulary during a current decoding process according to the current output decoding vector and the corresponding weight matrix.

In an embodiment, the determining an output probability of each expression word in the expression vocabulary during a current decoding process according to the current output decoding vector and the corresponding weight matrix includes:

generating a current binary vector corresponding to each expression word in the expression vocabulary according to a previous output expression word and a preset expression word constraint condition;

determining a product of the current output decoding vector and the corresponding weight matrix; and determining, according to the product and the binary vector, a current output probability of each expression word in the expression vocabulary.

In an embodiment, the determining, according to the product and the binary vector, a current output probability of each expression word in the expression vocabulary includes:

calculating a current output probability of each expression word in the expression vocabulary according to the following formula:

$$P(\hat{r}_t | h_t) = \frac{\rho_t \Box \exp(h_t^T W)}{\sum \rho_t \Box \exp(h_t^T W)},$$

where $P(\hat{r}_t|h_t)$ represents an output probability of each expression word in the expression vocabulary at a moment t during a current decoding process; t represents a decoding moment; $\hat{n}$ represents each expression word in the expression vocabulary participating in the output probability calculation at a moment t during the current decoding process; $h_t$ ht is a decoding vector output at the moment t during the current decoding process; $\rho_t$ is a binary vector corresponding to each expression word in the expression vocabulary at the moment t during the current decoding process; □ represents point multiplication; and W is a weight matrix in each dimension of the decoding vector $h_t$.

In an embodiment, before the encoding the question text sequence including the expression word into a semantic vector, the computer-readable instructions further cause the processor to perform the following steps:

obtaining a similarity between the question text sequence including the expression word and a prestored question text sequence;

determining a highest similarity between the prestored question text sequence and the question text sequence including the expression word; and then performing the step of encoding the question text sequence including the expression term into a semantic vector when the highest similarity is less than a preset threshold.

In an embodiment, the computer-readable instructions further cause the processor to perform the following steps:

when the highest similarity is greater than or equal to the preset threshold, obtaining an expression corresponding to the prestored question text sequence having the highest similarity; and substituting the numeral in the question text sequence including the expression word into the obtained expression to output an answer to the question.

In an embodiment, the obtaining a similarity between the question text sequence including the expression word and a prestored question text sequence includes:

obtaining a first phrase weight vector of the question text sequence including the expression word and a second phrase weight vector of the prestored question text sequence;

obtaining a modulus of an intersection set of the first phrase weight vector and the second phrase weight vector;

obtaining a modulus of a union set of the first phrase weight vector and the second phrase weight vector; and obtaining a similarity between the question text sequence including the expression word and the prestored question text sequence according to a ratio of the modulus of the intersection set to the modulus of the union set.

In an embodiment, the obtaining a first phrase weight vector of the question text sequence including the expression word includes:

obtaining a word frequency of each included phrase in the question text sequence including the expression word;

determining a weight of each phrase according to the word frequency, a total quantity of prestored question text sequences, and a quantity of prestored question text sequences including the phrase; and forming the first phrase weight vector of the question text sequence including the expression word according to the weight of the phrase.

In an embodiment, the determining a weight of each phrase according to the word frequency, a total quantity of prestored question text sequences, and a quantity of prestored question text sequences including the phrase includes:

determining a ratio of a total quantity of prestored question text sequences to prestored question text sequences including the phrase; and determining a weight of the phrase according to a product of the word frequency and the ratio.

In an embodiment, the determining a weight of the phrase according to a product of the word frequency and the ratio includes:

calculating a weight of each phrase according to the following formula:

$$W_{m,d} = tf_{m,d} * \frac{|D|}{|d \in D | m \in d|},$$

where d represents a question text sequence including an expression word; m represents a phrase included in the question text sequence d; $W_{m,d}$ represents a weight of the phrase m in the question text sequence d; $tf_{m,d}$ represents a word frequency of the phrase m in the question text sequence d; |D| is a total quantity of prestored question text sequences; and |d ∈ D|t ∈ d| represents a quantity of prestored question text sequences including phrase m.

In an embodiment, the computer-readable instructions further cause the processor to perform the following steps: outputting an answer to the question according to the expression where the expression word has been replaced with the numeral.

A person of ordinary skill in the art should understand that all or a part of the processes of the method in the foregoing embodiment may be implemented by a program instructing relevant hardware. The program may be stored in a computer readable storage medium. When the program is run, the processes of the method in the foregoing embodiment are performed. The storage medium may be a non-volatile storage medium such as a magnetic disk, an optical disc, or a read-only memory (ROM), or may be a random access memory (RAM) or the like.

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The above embodiments only express several implementations of the present application, which are described specifically and in detail, and therefore cannot be construed as a limitation to the patent scope of the present application. It should be noted that, a person of ordinary skill in the art may make various changes and improvements without departing from the ideas of the present disclosure, which shall fall within the protection scope of the present disclosure. Therefore, the protection scope of the patent of the present disclosure shall be subject to the claims.

What is claimed is:

1. A mathematical processing method for a textual question performed at a computing device having one or more processors and memory storing programs to be executed by the one or more processors, the method comprising:

obtaining a question text sequence;

mapping a numeral in the question text sequence to an expression word;

obtaining a similarity between the question text sequence comprising the expression word and a prestored question text sequence;

determining a highest similarity between the prestored question text sequence and the question text sequence comprising the expression word;

encoding the question text sequence comprising the expression word into a semantic vector when the highest similarity is less than a preset threshold;

decoding the semantic vector to generate a first expression, the first expression being an expression comprising the expression word; and replacing the expression word in the first expression with the mapped numeral, to obtain a second expression.

2. The method according to claim 1, wherein the mapping a numeral in the question text sequence to an expression word comprises:

determining the numeral in the question text sequence and corresponding contextual content;

inputting the determined numeral and the corresponding contextual content into a key numeral identification model to identify a key numeral in the question text sequence; and mapping the key numeral in the question text sequence to an expression word.

3. The method according to claim 1, wherein the encoding the question text sequence comprising the expression word into a semantic vector comprises:

converting each word in the question text sequence comprising the expression word into a word vector, to obtain a word vector sequence;

cyclically using, according to a sequential order of respective word vectors in the word vector sequence, a previous encoded value and a current word vector as input values of a current encoding process; and using a last encoded value as the semantic vector of the question text sequence comprising the expression word.

4. The method according to claim 1, wherein the decoding the semantic vector to generate a first expression comprises:

obtaining an expression vocabulary;

cyclically decoding the semantic vector to determine an output probability of each expression word in the expression vocabulary during each decoding process;

selecting an expression word having a maximum output probability during each decoding process for outputting; and combining, according to a sequential order of outputting, respective output expression words to generate the first expression.

5. The method according to claim 4, wherein the obtaining an expression vocabulary comprises:

identifying a key numeral in the question text sequence;

obtaining an initial expression vocabulary; and removing an expression word having no mapping relationship with the key numeral from expression words that have mapping relationships with numerals and that are in the initial expression vocabulary.

6. The method according to claim 4, wherein the cyclically decoding the semantic vector to determine an output probability of each expression word in the expression vocabulary during each decoding process comprises:

decoding the semantic vector and a previous output decoding vector to obtain a current output decoding vector and a corresponding weight matrix; and determining an output probability of each expression word in the expression vocabulary during a current decoding process according to the current output decoding vector and the corresponding weight matrix.

7. The method according to claim 6, wherein the determining an output probability of each expression word in the expression vocabulary during a current decoding process according to the current output decoding vector and the corresponding weight matrix comprises:

generating a current binary vector corresponding to each expression word in the expression vocabulary according to a previous output expression word and a preset expression word constraint condition;

determining a product of the current output decoding vector and the corresponding weight matrix; and determining, according to the product and the binary vector, a current output probability of each expression word in the expression vocabulary.

8. The method according to claim 1, further comprising:

when the highest similarity is greater than or equal to the preset threshold, obtaining an expression corresponding to the prestored question text sequence having the highest similarity; and substituting the numeral in the question text sequence comprising the expression word into the obtained expression to output an answer to the question.

9. The method according to claim 1, wherein the obtaining a similarity between the question text sequence comprising the expression word and a prestored question text sequence comprises:

obtaining a first phrase weight vector of the question text sequence comprising the expression word and a second phrase weight vector of the prestored question text sequence;

obtaining a modulus of an intersection set of the first phrase weight vector and the second phrase weight vector;

obtaining a modulus of a union set of the first phrase weight vector and the second phrase weight vector; and obtaining a similarity between the question text sequence comprising the expression word and the prestored question text sequence according to a ratio of the modulus of the intersection set to the modulus of the union set.

10. The method according to claim 9, wherein the obtaining a first phrase weight vector of the question text sequence comprising the expression word comprises:

obtaining a word frequency of each comprised phrase in the question text sequence comprising the expression word;

determining a weight of each phrase according to the word frequency, a total quantity of prestored question text sequences, and a quantity of prestored question text sequences comprising the phrase; and forming the first phrase weight vector of the question text sequence comprising the expression word according to the weight of the phrase.

11. The method according to claim 1, further comprising:

outputting an answer to the question according to the second expression.

12. A computing device comprising one or more processors, memory coupled to the one or more processors and a plurality of programs stored in the memory that, when executed by the one or more processors, cause the computing device to perform a plurality of operations comprising:

obtaining a question text sequence;

mapping a numeral in the question text sequence to an expression word;

obtaining a similarity between the question text sequence comprising the expression word and a prestored question text sequence;

determining a highest similarity between the prestored question text sequence and the question text sequence comprising the expression word;

encoding the question text sequence comprising the expression word into a semantic vector when the highest similarity is less than a preset threshold;

decoding the semantic vector to generate a first expression, the first expression being an expression comprising the expression word; and replacing the expression word in the first expression with the mapped numeral, to obtain a second expression.

13. The computing device according to claim 12, wherein the mapping a numeral in the question text sequence to an expression word comprises:

determining the numeral in the question text sequence and corresponding contextual content;

inputting the determined numeral and the corresponding contextual content into a key numeral identification model to identify a key numeral in the question text sequence; and mapping the key numeral in the question text sequence to an expression word.

14. The computing device according to claim 12, wherein the encoding the question text sequence comprising the expression word into a semantic vector comprises:

converting each word in the question text sequence comprising the expression word into a word vector, to obtain a word vector sequence;

cyclically using, according to a sequential order of respective word vectors in the word vector sequence, a previous encoded value and a current word vector as input values of a current encoding process; and using a last encoded value as the semantic vector of the question text sequence comprising the expression word.

15. The computing device according to claim 12, wherein the decoding the semantic vector to generate a first expression comprises:

obtaining an expression vocabulary;

cyclically decoding the semantic vector to determine an output probability of each expression word in the expression vocabulary during each decoding process;

selecting an expression word having a maximum output probability during each decoding process for outputting; and combining, according to a sequential order of outputting, respective output expression words to generate the first expression.

16. The computing device according to claim 12, wherein the plurality of operations further comprise:

when the highest similarity is greater than or equal to the preset threshold, obtaining an expression corresponding to the prestored question text sequence having the highest similarity; and substituting the numeral in the question text sequence comprising the expression word into the obtained expression to output an answer to the question.

17. The computing device according to claim 12, wherein the plurality of operations further comprise:

outputting an answer to the question according to the second expression.

18. A non-transitory computer readable storage medium storing a plurality of machine readable instructions in connection with a first terminal having one or more processors, wherein the plurality of machine readable instructions, when executed by the one or more processors, cause the first terminal to perform a plurality of operations including:

obtaining a question text sequence;

mapping a numeral in the question text sequence to an expression word;

obtaining a similarity between the question text sequence comprising the expression word and a prestored question text sequence;

determining a highest similarity between the prestored question text sequence and the question text sequence comprising the expression word;

encoding the question text sequence comprising the expression word into a semantic vector when the highest similarity is less than a preset threshold;

decoding the semantic vector to generate a first expression, the first expression being an expression comprising the expression word; and replacing the expression word in the first expression with the mapped numeral, to obtain a second expression.

19. The non-transitory computer readable storage medium according to claim 18, wherein the mapping a numeral in the question text sequence to an expression word comprises:

determining the numeral in the question text sequence and corresponding contextual content;

inputting the determined numeral and the corresponding contextual content into a key numeral identification model to identify a key numeral in the question text sequence; and mapping the key numeral in the question text sequence to an expression word.

20. The non-transitory computer readable storage medium according to claim 18, wherein the encoding the question text sequence comprising the expression word into a semantic vector comprises:

converting each word in the question text sequence comprising the expression word into a word vector, to obtain a word vector sequence;

cyclically using, according to a sequential order of respective word vectors in the word vector sequence, a previous encoded value and a current word vector as input values of a current encoding process; and using a last encoded value as the semantic vector of the question text sequence comprising the expression word.

* * * * *